Feb. 14, 1961 C. D. GARCIA 2,971,794
VEHICLE BODY ASSEMBLY HAVING PASSENGER
ENCLOSURE EXTENSION OR ADDITION MEANS
Filed Sept. 9, 1958 6 Sheets-Sheet 1

INVENTOR.
CLARENCE D. GARCIA
BY
McMorrow, Berman + Davidson
ATTORNEYS

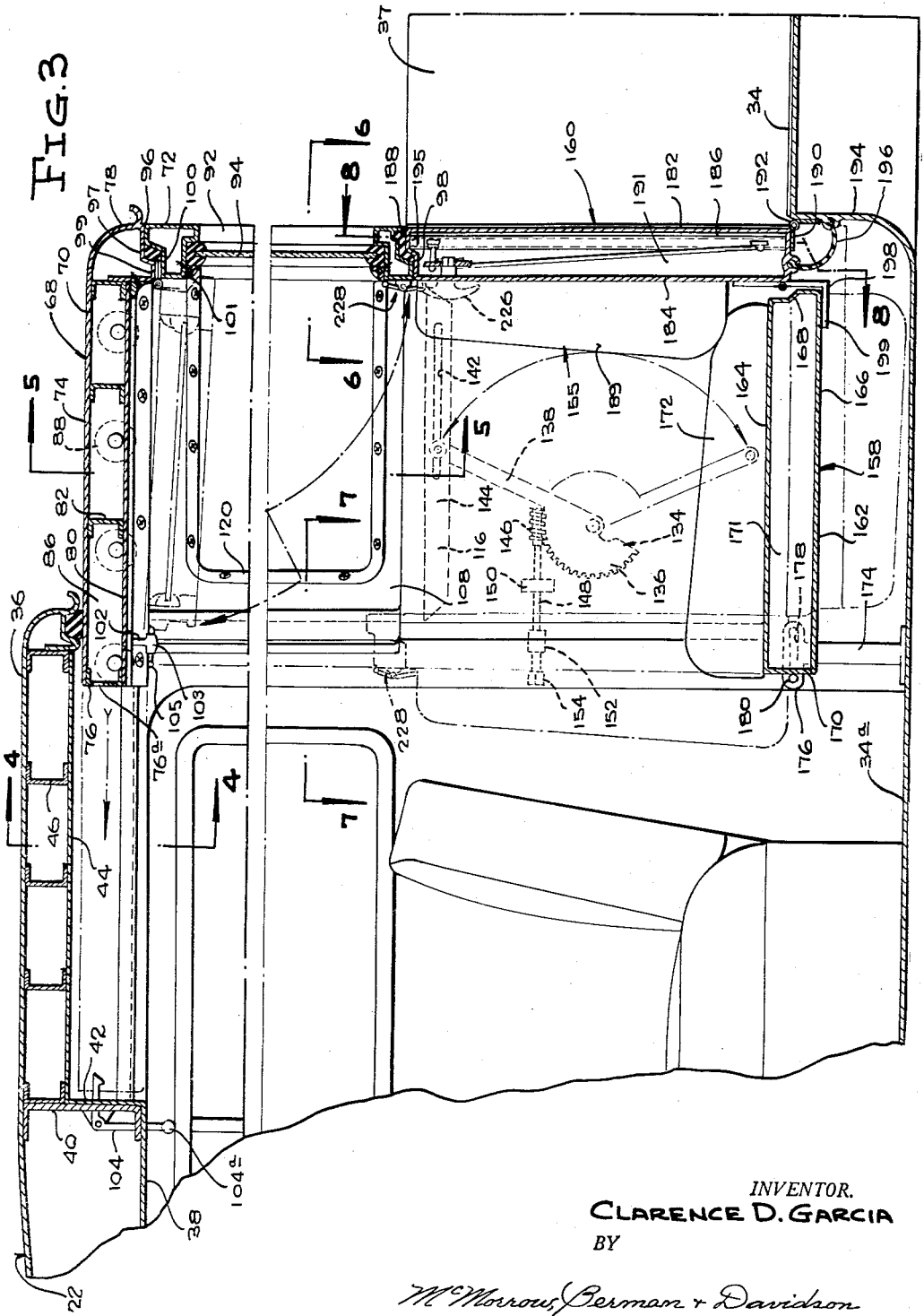

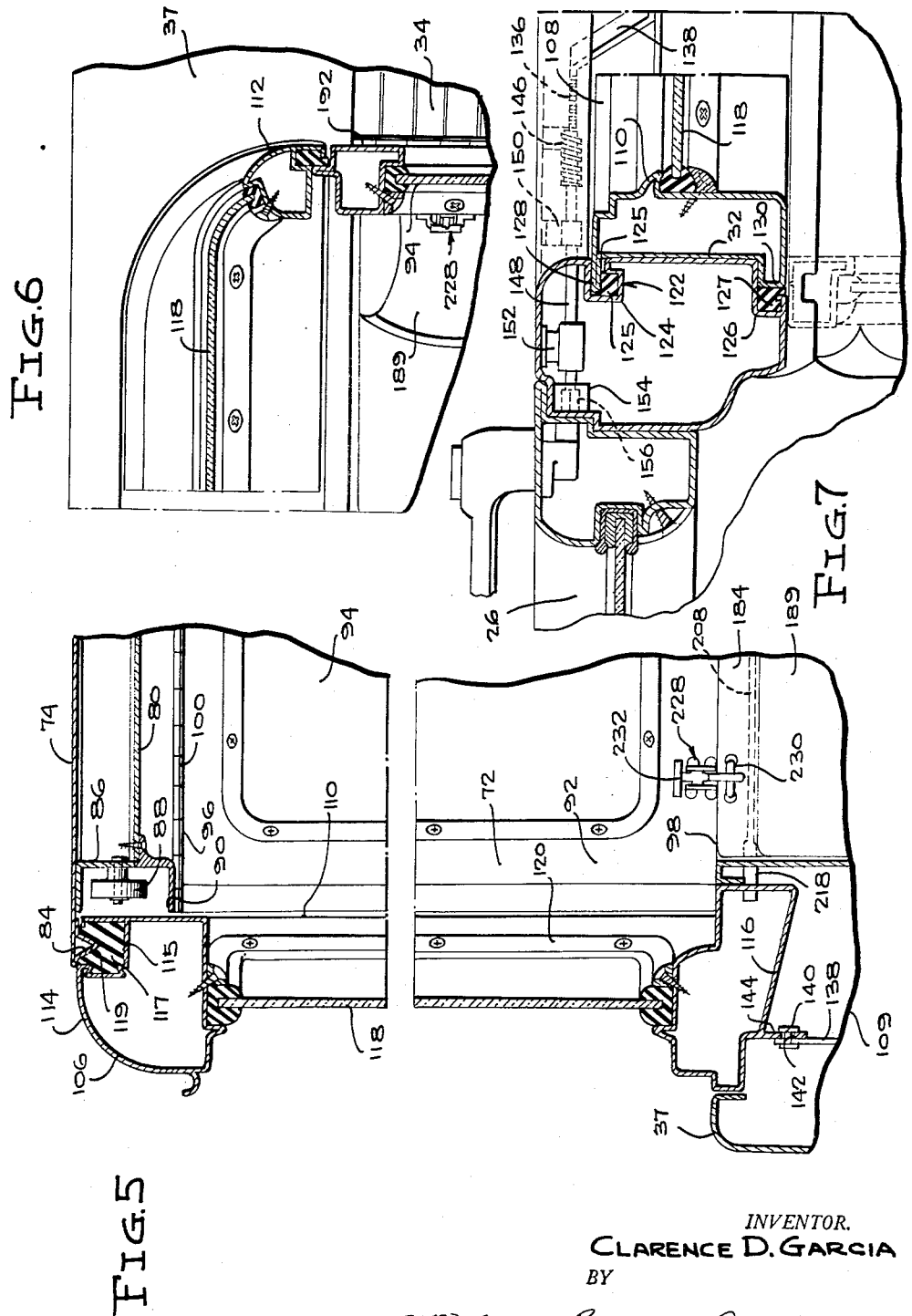

Feb. 14, 1961
C. D. GARCIA
2,971,794
VEHICLE BODY ASSEMBLY HAVING PASSENGER
ENCLOSURE EXTENSION OR ADDITION MEANS
Filed Sept. 9, 1958
6 Sheets-Sheet 4
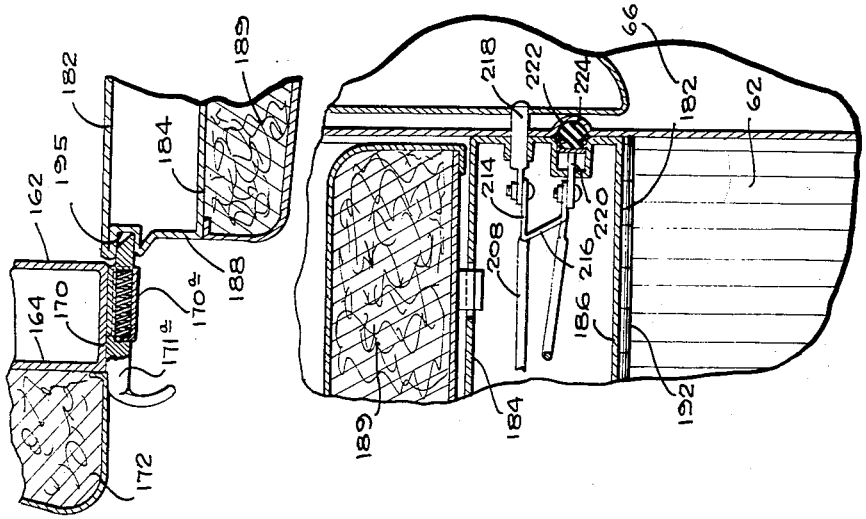
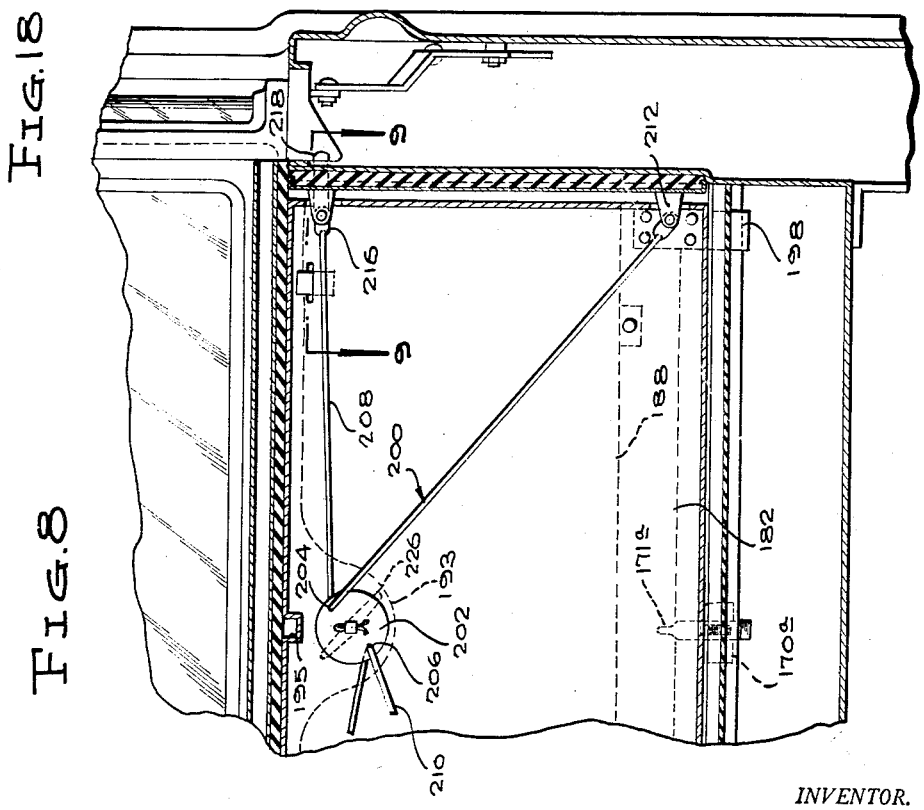
INVENTOR.
CLARENCE D. GARCIA
BY
McMorrow, Berman & Davidson
ATTORNEYS Feb. 14, 1961  
C. D. GARCIA  
2,971,794  
VEHICLE BODY ASSEMBLY HAVING PASSENGER  
ENCLOSURE EXTENSION OR ADDITION MEANS  
Filed Sept. 9, 1958  
6 Sheets-Sheet 5
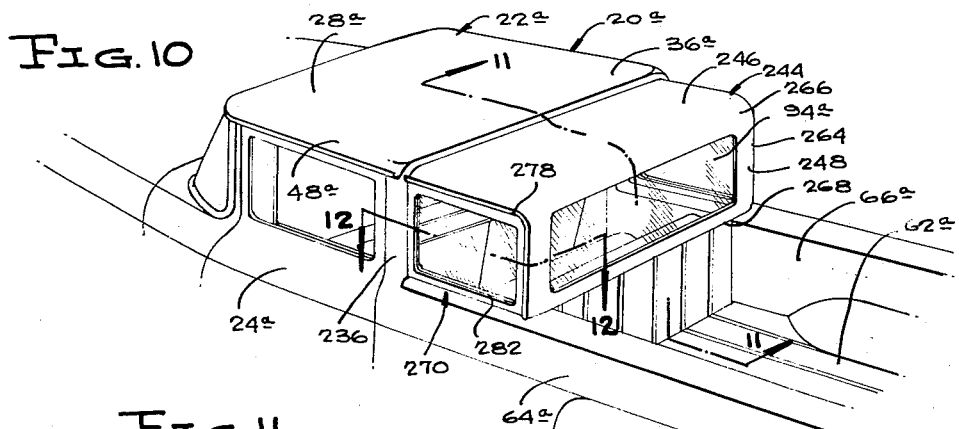
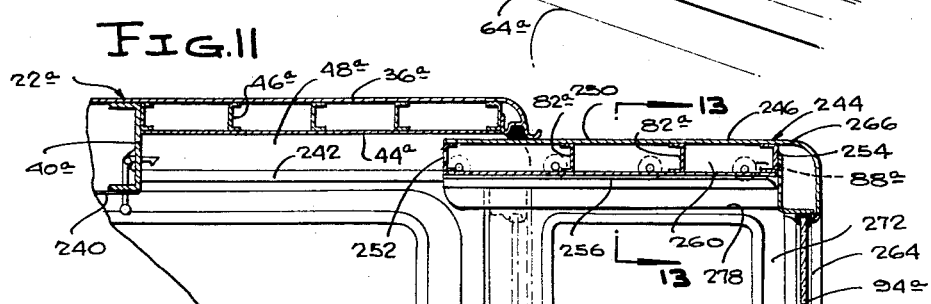
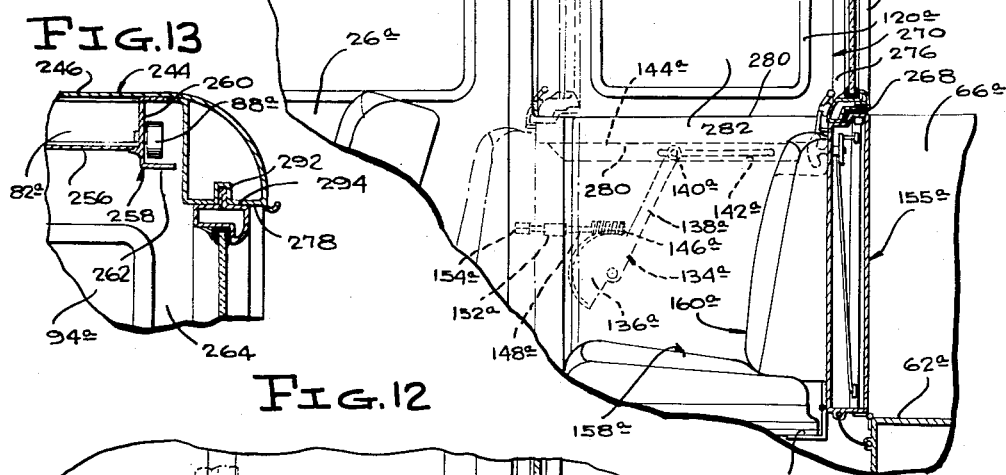
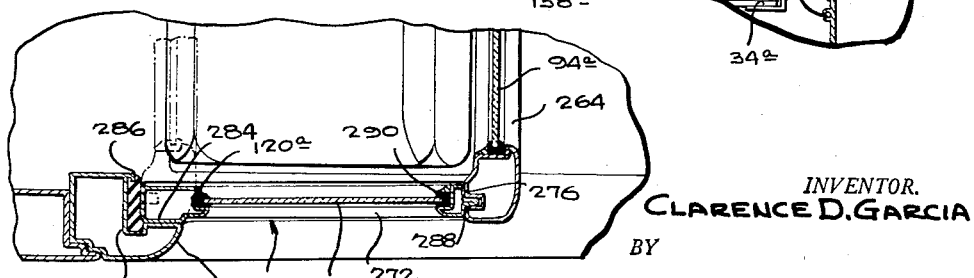
INVENTOR.  
CLARENCE D. GARCIA  
BY  
*McMorrow, Berman + Davidson*  
ATTORNEYS Feb. 14, 1961
C. D. GARCIA
2,971,794
VEHICLE BODY ASSEMBLY HAVING PASSENGER
ENCLOSURE EXTENSION OR ADDITION MEANS
Filed Sept. 9, 1958
6 Sheets-Sheet 6
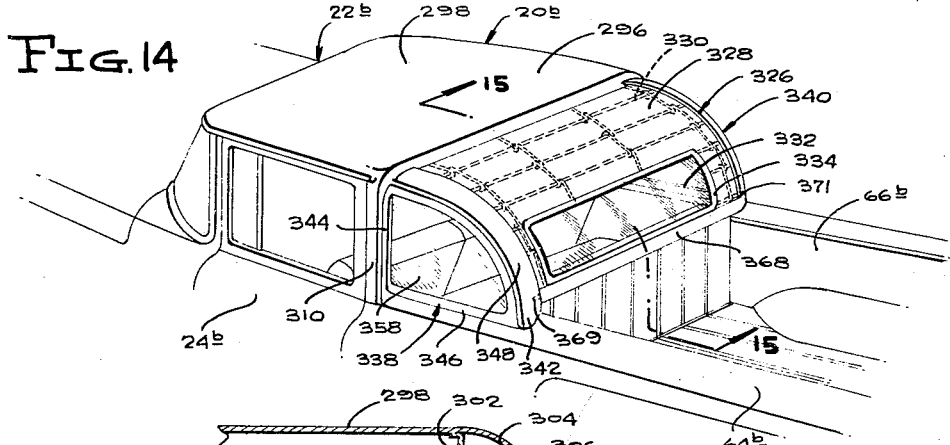
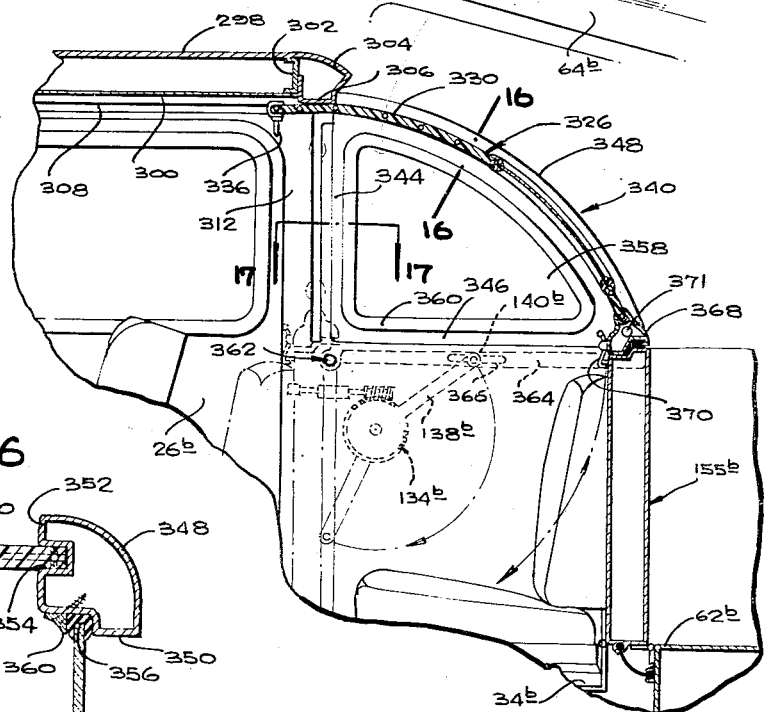
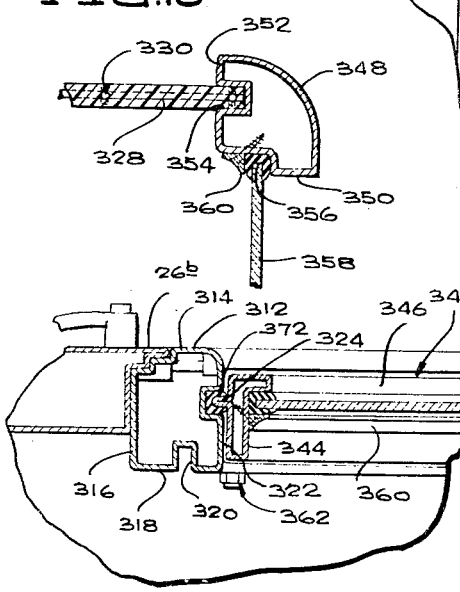
INVENTOR.
CLARENCE D. GARCIA
BY
McMorrow, Berman & Davidson
ATTORNEYS United States Patent Office 2,971,794
Patented Feb. 14, 1961

2,971,794

VEHICLE BODY ASSEMBLY HAVING PASSENGER ENCLOSURE EXTENSION OR ADDITION MEANS

Clarence D. Garcia, Midway Island, Va.
(209 S. Waldo Ave., Fullerton, Calif.)

Filed Sept. 9, 1958, Ser. No. 760,016

13 Claims. (Cl. 296—26)

The present invention relates to novel and useful improvements in vehicle body constructions and, in particular, is directed to the provision of a vehicle body assembly having extension or addition means for increasing the passenger enclosure space.

A primary object of the present invention resides in the provision of means for increasing the passenger enclosure space of a vehicle body without detracting from the appearance and utility of such vehicle body when such addition or extension means is not in use and in a way enabling such means to be placed in use very quickly and easily, without requiring any special tools or extensive manual labor.

Still another important object of the present invention resides in the provision of a vehicle body assembly of what is generally termed as the pick-up type, that is having a cab and an open load carrying body disposed rearwardly of the cab, with means for housing a passenger enclosure extension or addition means for the cab, which means is housed in the cab and body in a manner not disturbing or interfering with the utility of the body or marring or detracting from the appearance of the body or the cab and which means requires only slight modification of the cab and body to be housed therein.

A further important object of the present invention resides in the provision of means to increase the passenger carrying capacity of a pick-up truck from a single seat body into a full two seat body by providing an extension that is structurally associated with the cab and the sidewalls of the body so that the extension may be stored therein when not in use and easily and quickly erected into a complementary position rearward of and in contiguous relation with the cab, whereby a rearward extension or projection of the cab is formed.

A further important object of the present invention resides in the provision of means for enlarging or increasing the passenger enclosure space of the single-seat cab of a pick-up truck, such means being formed and constructed so that a portion thereof serves as a part of the cab structure, when not in use, with the portion of the means not functioning as a part of the cab enclosure being formed to be stored in a manner as to not interfere with the utility of the body of the pick-up truck nor to mar the appearance of the cab or body.

A still further important object of the present invention resides in the provision of an extension for the single seat cab of a pick-up truck, which extension is composed of a roof, that is telescopically carried by the cab roof; of sides, that are stored in the side walls of the body; of an upper rear panel that in the stored position of the extension serves as the upper rear panel of the cab; and of a lower rear panel that, in the stored position, is mounted flat on the bed of the body, with the inner surface of the lower rear panel, in its erected position, forming the back rest of the seat assembly in the cab extension; the seat of such assembly being defined by the inner surface of the lower rear panel for the cab which latter panel is moved rearwardly from its vertical position to a horizontal position to provide the seat.

The foregoing and ancillary objects are attained by this invention, the preferred embodiments of which are set forth in the following description and illustrated in the accompanying drawings, wherein:

Figure 3 is an enlarged longitudinal vertical sectional view taken substantially on line 3—3 of Figure 1;

Figure 5 is a detailed cross-sectional view, taken substantially on line 5—5 of Figure 3;

Figure 6 is a detailed horizontal cross-sectional view taken substantially on line 6—6 of Figure 3;

Figure 7 is a detailed cross-sectional view taken substantially on line 7—7 of Figure 3;

Figure 8 is an enlarged vertical sectional view taken substantially on line 8—8 of Figure 3;

Figure 9 is a detailed horizontal cross-sectional view taken substantially on line 9—9 of Figure 8;

Figure 10 is a perspective view of a pick-up truck, showing a modified form of the passenger enclosure addition or extension means of the present invention;

Figure 11 is a longitudinal vertical sectional view taken substantially on line 11—11 of Figure 10;

Figure 12 is a detailed horizontal cross-sectional view taken substantially on line 12—12 of Figure 10;

Figure 13 is a detailed vertical sectional view taken substantially on line 13—13 of Figure 11;

Figure 14 is a perspective view of a pick-up truck, showing a still further form of the passenger enclosure addition or extension means of the present invention;

Figure 15 is a longitudinal vertical sectional view taken substantially on line 15—15 of Figure 14;

Figure 16 is a detailed vertical sectional view taken substantially on line 16—16 of Figure 15;

Figure 17 is a detailed horizontal cross-sectional view taken substantially on line 17—17 of Figure 15; and Figure 18 is an enlarged fragmentary detail sectional view of the locking means for holding down the back rest of the auxiliary seat section.

Figure 1:
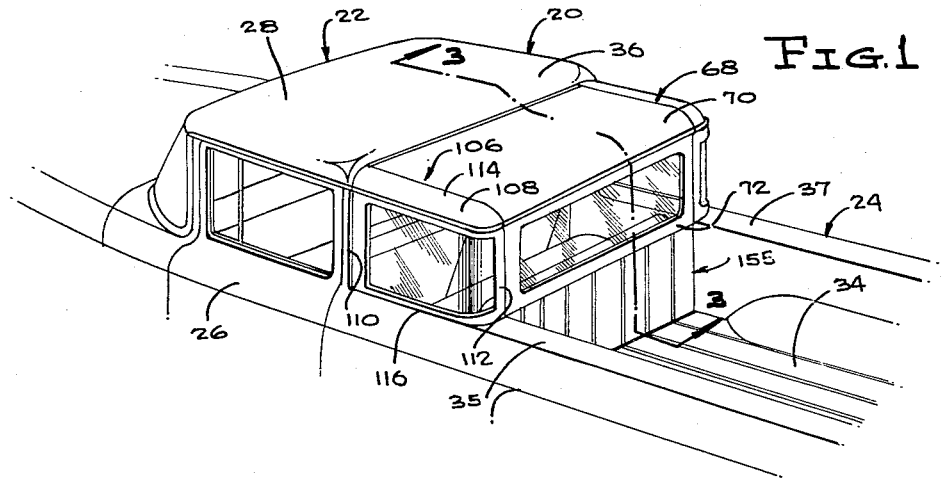
Figure 1 is a fragmentary perspective view of a pick-up truck with the passenger enclosure addition or extension of the present invention shown in its operative or erected position.

Generally stated, the primary aim and purpose of the present invention is to provide means for increasing the passenger enclosure space of a pick-up truck. Such a truck includes a single seat cab and, rearwardly extending therefrom, a body, which consists of an open load carrying bed or floor and side panels. The bed or floor is designed, both functionally and structurally, to receive various types of materials or other objects so as to constitute a load carrying surface.

Primarily, the purpose of such a truck is to transport materials or objects in the body, with the single seat cab being able to accommodate only one, two or possibly three passengers.

Oftentimes, it is desirable to utilize such a vehicle as a two seat passenger carrying vehicle, along the lines of a station wagon. To accomplish this end, it is the primary aim of the present invention to increase the passenger carrying space of such a vehicle by increasing the passenger carrying capacity of the cab. And yet, it is desired to attain this end by not detracting from the utility of the vehicle in its load carrying capacity.

or marring or otherwise altering the appearance of the cab or body from its conventional design and without altering the wheel base of the truck or providing any strain on the body or cab.

Therefore the primary aim and purpose of the present invention resides in the provision of passenger enclosure extension or addition means which is normally stored within the cab and body so as to not be discernible but which can be easily and readily moved into a position so as to increase, in a safe manner, the passenger carrying capacity of the cab from one, two or three passengers to five, six or seven passengers.

As a part of the purpose and aim of the present invention, it is desired that such means be stored within the roof of the cab and within the side panels of the body, when not in use and that such means also form the back wall of the cab, when not in use. When in use, such means may be readily and easily moved from the stored position to a position wherein it constitutes a rearward prolongation of the cab and wherein the roof of the cab is extended rearwardly towards the body and side window frames are moved upwardly from the side panels of the body, while the rear panel of the cab is moved rearwardly so as to constitute the rear panel of the extension or prolongation of the cab.

As a part of the cab addition or extension, seat means is provided, which seat means consists of a seat assembly constituted by a seat member and a back member. In one position, the seat member may form a part of the back panel of the cab, when the passenger enclosure extension or addition is not in use, with the back member of the addition forming a part of the deck or floor of the body. When the cab addition or extension is in use, such seat member is moved into a horizontal position, complementing the back member, which then assumes a vertical position and which then complements the cab extension or addition in forming a part of the back wall or panel thereof.

It can be appreciated that the cab addition or extension is carried as a part of the pick-up truck, in that it is carried by the cab and by the side panels and floor of the body, without detracting from the utility thereof nor without being apparent in their structural association with the cab and body, when not in use. However, when moved into a position of use, the cab extension or addition readily complements the cab in increasing the passenger enclosure capacity thereof and is designed in a manner so as to complement the structural and functional design of the cab and the body.

While a pick-up truck of conventional structure and design has been referred to in the general description of the purpose, design and function of the present invention, it is to be understood that the present invention is designed for addition to or adoption by any vehicle body and has for its main aim and purpose to increase the passenger enclosure capacity of any vehicle, irrespective of its make, type or style.

Referring now more particularly to the accompanying drawings, and initially to Figures 1–9, the pick-up truck 20, which is merely exemplary of the type of standard or conventional vehicle with which the passenger enclosure extension or addition of the present invention may be employed, includes a cab 22 and a body 24. The cab comprises a roof structure 28 supported at its rearward end by conventional stanchions or corner posts 30 and 32. The body 24 of the truck, which extends rearwardly from the cab, includes the conventional bed or floor 34 and side panels 35 and 37.

Figure 4:
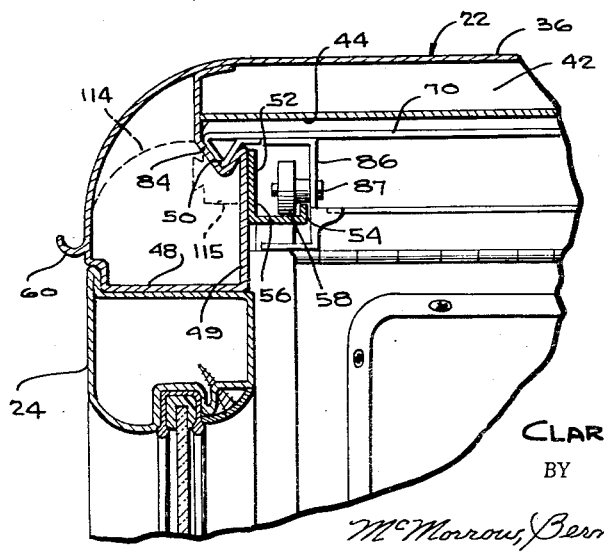
Figure 4 is a detailed cross-sectional view taken substantially on line 4—4 of Figure 3.

The roof structure 28 of the cab, which is shown particularly in Figures 3 and 4, is substantially hollow and includes an outer panel 36 spaced from the header 38 by the transverse, structural bars 40. The rearward vertical end 42 of the header 38 is secured to the cross bar 40 and the roof structure, as shown particularly in Figure 3, is formed so that the rearward portion thereof is of a reduced vertical dimension. In other words, the cross bar 40 forms a dividing point between the front and rear portions of the roof structure with the portion 44 of the header being connected by the cross bars 46 to the rearward end portion of the panel 36. By such construction, the roof structure is reduced in the vertical dimension at its rearward end portion of the cab so as to provide a compartment or pocket in the cab roof to accommodate the roof section of the passenger enclosure addition or extension means of the present invention. Obviously, other structural connections may be made between the panel and the header and only for the purpose of example is the present construction illustrated and described, respecting the particular structural presence and association of the panel cross bars and header.

The sides of the panel 36 are formed upon themselves in inwardly turned fashion so as to define substantially hollow side frames 48. Such side frames have inner walls 49, which are formed intermediate their upper and lower ends with V-shaped depressions 50 that constitute longitudinally extending rails or tracks. Secured to the vertical inner sides of the hollow side frames 48, adjacent the tracks 50, are substantially L-shaped rails 52. The vertical legs of such rails are suitably secured on the inner sides of the side frames 48 so as to present the horizontal portions 58 in inwardly directed, lateral fashion. At the inner side edges of the horizontal portions 58, vertically upstanding safety flanges 54 are provided. The tracks 50 and the flanges 58 provide a support for suitable carriage means for the roof section of the passenger enclosure extension or addition means of the present invention.

As shown particularly in Figure 4, the side frames 48 are formed in a manner so as to not interfere with the conventional design or functional purpose of the roof structure 28. Thus, the conventional gutter 60 is provided and, in addition, it is to be noted that the inner wall of the side frames 48 rigidifies the panel 36 at its longitudinal side edges besides constituting, in its V-shaped track formation and in its support of the rails 52, a supporting means for the sliding roof section 70 of the extension or addition means.

The roof section 70 includes a top panel 74 having a squared inner end 76 and an outer end 78 of suitable curvature. A header 80 is held in spaced relationship with the panel 74 by a plurality of reinforcing members 82.

As shown in Figure 4, the sides of the panel 74 terminate in longitudinally extending triangular bosses 84 which are slidably positioned in the tracks 50. Inwardly of the bosses, flat side walls 86 depend from the panel 74 and support stub axles 87 that extend laterally, outwardly therefrom. Rollers 88 are rotatably mounted on the outwardly extending ends of the axles and are rotatably disposed on the rails 52. The side walls 86 are provided with molding strips 90 which extend laterally outwardly from the lower edges thereof and serve as coverings for the rollers when the roof section 80 is in its extended position. The molding strips also cover the rails 52 when the roof section is in its stored position.

As can be seen from Figure 3, the upper rear panel assembly 72 serves as the upper rear portion of the cab when the roof section 70 is in its stored position and also serves as the upper rear portion of the extension or addition means when the roof section 70 is in its extended position.

The upper rear panel assembly 72 includes a substantially rectangular frame 92 having a window or transparent panel 94 suitably mounted therein. The upper end 96 of the frame is hinged by a hinge means 100 to the rear end of the roof section 70. As shown in Figure 3, the inside of the roof section, at its rear end, is closed off by a transverse molding strip 97 having an inwardly stepped inner portion 99 to which the leg portion 101 of the substantially T-shaped upper end 96 of the frame is hinged as at 100.

This permits the upper rear panel assembly 72 to swing inwardly and upwardly into the position shown in phantom lines in Figure 3, such positioning of the panel assembly 72 being possible in either the stored or extended position of the roof section 70.

T-shaped supports 102 depend from the header 80 at its inner end and have their hollow heads 103 disposed longitudinally to support spring urged keepers 105 which are adapted to engage in suitable openings in the outer edge of the lower end 98 of the panel assembly 72 so as to lock the panel assembly in its raised position.

By virtue of the carriage assembly, which includes the bosses 50 and the rollers 88, cooperating with the tracks 50 and rails 52, the roof section 70 can slide rectilinearly into the roof 28 of the cab. The inner end 76 of the roof section is formed with an aperture 76a within which the keeper end of a crank type latch 104 is adapted to be inserted to lock the roof section 70 within the cab. The latch is pivoted within the roof 28 of the cab and the handle end 104a extends through the header 38 to the interior of the cab. Thus, the latch is manually operable from inside the cab to release the roof section for sliding movement into its extended position and the roof section is automatically latched when it is slid inwardly into its stored position.

The extension means further includes side frame members 106 which are housed in wells 109 formed in the side walls 35 and 37 of the truck body. The frame members are movable, as will be described, from lowered, stored positions, wherein they are not visible and do not interfere with pay loads in the body, into raised, operative positions, wherein they cooperate with the roof section 70 in forming the added passenger enclosure space for the cab.

Each frame member 106 includes a substantially rectangular frame 108 having a front end 110 and a rear end 112 of suitable curvature. Top and bottom sections 114 and 116 complete the frame 108.

The top section of each frame is formed on its inner side with a longitudinal groove 115 within which a sealing gasket 117 is mounted, the gasket being provided to engage the bosses 84 when the roof section is extended rearwardly and thereby provide a watertight seal between the sides of the roof section and the side frame members. In this respect, when the roof section is in its extended position, the side frame members support the sides thereof with the inner end of the roof section supported by the roof of the cab. This affords a watertight, secure and rigid extension means for the cab.

Window panels 118 are mounted in the open frames 108 in a conventional manner by beading 120. As shown, the window panels 118 are fixed in place but, obviously, any conventional window structure may be used whereby the window panels 118 are mounted for movement into open and closed positions.

When the side frame members 106 are moved into a raised position, as shown in Figure 7, they cooperate with the corner posts 30 and 32 in forming a watertight extension of the sides of the cab 22. Each of the corner posts has a channel like guide member 122 vertically formed on the rearward surface thereof. The guide member 122 is composed of channels 124 and 126 within which gaskets 125 and 127 are mounted. The front end section 110 of each frame member 106 is formed in channel-like fashion with projections 128 and 130 which fit into the channels and compress the gaskets to provide the watertight fit between the corner posts and the side frame members 106 when the side frame members are in raised positions.

The side frame members are raised and lowered from and into the wells 109 in the side walls of the truck body by an actuating means 134 which is shown in Figure 3. The actuating means 134 includes sector gears 136 (one being provided for each side frame member) which have operating arms 138 extending outwardly therefrom. The arms 138 terminate in laterally outstanding bosses 140 which are slidably engaged in slots 142 formed in flanges 144 that depend from the lower sides 116 of the side frame members 106. The teeth of the gear 136 are in meshing engagement with worm gears 146 which are circumposed on the rear ends of longitudinally extending rods 148. The rods 148 are rotatably mounted on the inner wall of the side walls or panels 35 and 37 of the truck body by means of bearing mounts 150 and 152 and have enlarged front ends 154 which terminate in tool engaging means 156. The ends 154 are disposed within the cab so as to be reached from the interior of the cab.

Figure 2:
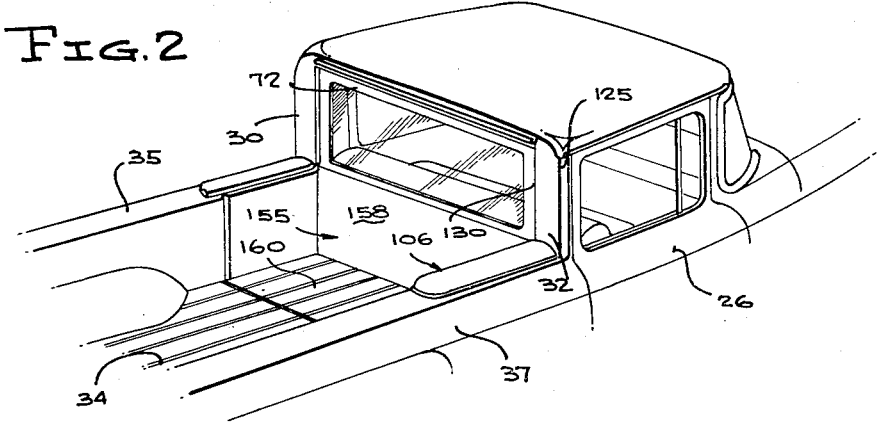
Figure 2 is a fragmentary perspective view of the pick-up truck, with such passenger enclosure extension or addition shown in its stored position.

As can be seen by considering Figures 1 and 2, the seat structure 155 forms an essential component of the cab extension means in addition to serving as the seat structure in the cab extension means. In this respect, the seat panel 158 forms the lower back panel for the rear wall of the cab 20 when the cab extension means is in its stored position, as shown in Figure 2. In such vertical position, it complements the upper rear panel assembly 72. When the cab extension means is in its used erected position, as shown in Figure 1, the upper rear panel assembly 72 forms the upper part of the back wall of the cab extension means with the back assembly 160 forming the lower part of the back wall of the cab extension.

The seat panel 158 consists of a hollow frame 162 having spaced apart first and second walls 164 and 166 and long sides 168 and 170 and short ends 171 with a cushion or pad 172 being mounted on the outer face of the first wall 164. The outer face 166 of the frame is formed or finished in a suitable manner so as to withstand the elements, since it serves as the outer wall for the cab, as shown in Figure 2. The long side 170 has a keeper 170a having a spring biased plunger 171a journaled for reciprocation therein for a purpose dealt with more fully below. (See Fig. 18.)

The sides 168 of the frame are provided with pintles 180 which laterally extend beyond the ends 171 and are slidably and rotatably fitted in slots 178 formed in the upper heads 176 of T-shaped supports 174 that have their legs or standards mounted on the floor of the bed well 34a. In this respect, it can be noted, from a consideration of Figure 3, that the front end of the bed 34 is formed with a well or indentation that serves to house the back assembly 160 when it is in its stored position (shown in dotted lines). When the seat panel 158 is moved from its vertical (dotted line) position to its horizontal (full line position), it overlies the well 34a.

The back panel structure 160 includes a hollow frame 182 which consists of first and second walls 184 and 186 and opposing sides 188 and 190 and end walls 191. A cushion 189 is secured on the outer face of the wall 184, the cushion being formed with a cut-out portion 193 at the center of the side 188 for a purpose to be described, and the side 188 is provided with a centrally disposed socket 195, the purpose of which is to receive the end of the plunger 171a.

The frame 182 is hingedly connected to the bed 34 by a hinge means 192 which secures the side 190 to the rear wall 194 of the well 34a, as shown in Figure 3, so that the outer face of the second wall 186 can be disposed flush with the bed or floor 34 when the panel structure 160 is in its stored, horizontal position. The hinge means permits the rearward, vertical movement of the panel structure 160 into its vertical position with the well 34a being closed off. Assisting in such closing of the well is a flexible seal 196 which extends between the wall 194 and the panel side 190 and which underlies the hinge means 192.

Rests 198, which are L-shaped, have their long legs fixed to the outside of the wall 184 so that the flanges 199 extend outwardly therefrom to support the seat frame 162 in its horizontal position, as shown in Figure 3.

Figures 8 and 9 illustrate in detail the means 200 for retaining the back structure 160 in its upright position. The means 200 include a discoidal plate 202 having diametrically opposed apertures 204 and 206 through which flexible rods 208 and 210 are passed. The rods 208 and 210 have one of their ends fixedly secured to the respective ends of the frame adjacent the sides 190 by connecting means 212 and the opposed ends of the rods are split to define prongs 214 and 216. The prong 214 is secured to a plunger lock 218 which is slidably engageable in coaxial apertures formed in the ends of the frame 182 and in the side wall 66. The other prong 216 is secured to a plunger rod 220 having a rubber seal 222 affixed to the outer end thereof. As seen in Figure 9, the seal 222 is engageable in a depression 224 in the side wall 66. A suitable handle 226, positioned in the indentation 193 in the seat cushion 189, is provided for rotation of the plate 202 and it will be seen that a rotation thereof will cause the rods 208 and 210 to be drawn inwardly thus disengaging the plungers 218 and seals 222 from their positions within the side walls 66 and 64.

Figure 5 shows one of a plurality of fastening means 228 which are supplied in order to secure the side 188 of the back 160 to the lower end 98 of the frame 92. The means 228 includes U-shaped brackets 230 fixedly connected to the side 184 of the frame 182 and tension clips 232 that are secured to the inner side of the frame 92 and are selectively engageable and disengageable in the aforesaid brackets.

The operation of the form of the invention described supra is as follows, assuming the auxiliary cab to be in the retracted position shown in Figure 2:

The operator first disengages the plunger 171a from the socket 195 and then manually raises the seat back member 160 to the upright position shown in Figure 3 and, by rotation of the handle 226, the plunger 218 and seal 222 are aligned with the seats therefor provided in the side walls 64 and 66, when the seats are aligned with the plunger and seals; the handles causing the plungers and seals to engage in their respective seats and lock the back assembly 160 in its upright position. As a next step, the seat assembly 158 is manually lowered from the upright position shown in phantom lines in Figure 3 into the solid line position of that figure. It will be readily seen that this step involves the sliding of the pivot pins 180 in the slot 178 of the T-shaped standard 174 and the pivoting of the seat to engagement of the outer wall 166 with the L-shaped bars 198.

The auxiliary roof 68 is extended for connection with the side frame members 106 by sliding the roof member rearwardly away from its nested position within the main cab roof 28. The latch 104 is first disengaged by exerting a rearward force against the actuating handle thereof, thus allowing the hooked end thereof to be cleared of the aperture 105 formed in the end 76 of the auxiliary roof member 68. The rollers 88 roll in the tracks 58 of the rail 56 and the triangular extensions 84 slide along the slots 50, and into the channel formed in the upper end of the side walls 106. As seen in Figure 5, the seal in this channel strip causes a watertight connection to be formed between the side frame 106 and the auxiliary roof member 68.

The side doors 24 and 26 of the main cab are opened, and a suitable manual or power tool means is inserted into the tool engaging means 156 to rotate the rod 148. This rotation of the actuating rods 148 causes the arms 138 to pivot upwardly, and the bosses 140 to slide in the slots 142, thus moving the side frame members to the upwardly extended positions as shown in Figure 1.

As a final step, the rear window assembly 72 is placed in engagement with the upper end 188, and the fastening means 228 are utilized to secure the parts to one another.

Proceeding now to a description of a modified form of this invention chosen for purposes of illustration, and illustrated in Figures 10 through 12, inclusive, it will be seen that reference numeral 20a is applied to the vehicle, in general. This form also has a main cab assembly 22a including a pair of oppositely disposed cab doors 24a, 26a, and a substantially rectangular main cab roof 28a. As seen in the drawing, a pair of rear cab wall panels 236, 238 of substantially hollow construction are also provided, as well as a cab floor 34a.

The main roof 28a is provided with an outer shell 36a which is spaced from a substantially parallel first header 240 by a substantially U-shaped, elongated bar 40a and a second header 44a is also parallel to and spaced from the shell 36a by a plurality of spaced, U-shaped reinforcing bars 46a. The sides 48a of the cab roof 28a have L-shaped caster supports 242 fixedly secured to the inner sides thereof for a purpose described below.

In this form, the vehicle body also includes a rearwardly extending truck bed 62a which has upwardly extending, substantially hollow, rectangular side walls 64a, 66a.

Proceeding now to the auxiliary roof 244, it will be seen that in this form the auxiliary roof and the rear window are integrally formed. The roof 244 includes a roof portion 246 and rear window assembly 248, the rear window 248 forming a dependent, integral, rear extension of the roof 246. The roof portion 246 has a substantially flat, rectangular outer panel 250 including an inner end 252 and an opposed outer end 254, the outer panel 250 being held in spaced relationship relative to a substantially rectangular header 256 by a plurality of substantially U-shaped reinforcing members 82a. The roof 246 also has L-shaped bars 258 depending from the outer panel 250 and secured to the header 256, a plurality of freely rotatable casters 88a being spaced along the leg portion 260 thereof, and the foot 262 thereof serving to hide the casters 88a from view. As is obvious in the drawings, the casters 88a ride in the caster support 242 and are the means by which the assembly 244 is rectilinearly slidable into and out of the cab 22a.

The main window assembly 248 is seen to function as the rear window closure for the vehicle cab in either its extended or retracted position (the retracted position being shown in phantom lines in Figure 11). The assembly includes a substantially rectangular hollow frame 264 with a suitable mounted glass window panel 94a positioned therein. The frame includes a rounded upper end 266 and a lower end 268 of a configuration to correspond with the upper end of the seat back structure described below to which it is secured by the means 228 when in its extended position.

In this embodiment of the invention the side frame members (both of which are substantially identical except for the reversal of their respective parts) are identified by general reference numeral 270 and include substantially rectangular frames 272 having front and rear walls 274 and 276, and top and bottom ends 278 and 280. Glass window panels 282 are suitable mounted in the frames 270 by means of conventional beading 120a.

The frames 270 are seen to be movably carried in the side walls 62a, 64a and the ends 274 are slidable in notches 284 formed in the inner corners of the foresaid walls—the notches 284 having resilient gaskets 286 for providing seals between these adjacent parts. The other ends 276 have elongated guide strips 288 extending therefrom which are slidable in grooves 290 formed on the inner sides of the window frames 272 adjacent the outer ends thereof, and the top ends 278 have a like strip 292 extending therefrom transversely thereacross.

With special reference to Figure 13, it will be seen that the outer ends of the auxiliary roof 246 are provided with slots 294 which receive the strip 292 when the frames 270 are in their upwardly extended positions.

The frames 270 are extended and retracted by activating means 134a which are substantially identical to the activating means 134 of the form of the invention shown previously in Figures 1 through 9, inclusive, and include a semi-circular gear 136a pivotally mounted to the side wall 66a or 64a and having an elongated arm 138a extending therefrom. The arms 138a are provided with bosses 140a at the outer ends thereof, the bosses being slidably disposed in elongated slots 142a formed in the trapezoidal flanges 144a which depend from the ends 280 of the frames 270, 272. A cylindrical driving gear 46a is mounted at the end of a rod 148a supported in a support member 152a and has tool engaging means 154a at the opposed end thereof. The gear 146a is in engagement with the gear 136a.

The auxiliary seat structure 155a, which includes a seat assembly 158a and back assembly 160a, is substantially identical in construction, assembly, and operation to the seat structure 155 shown in connection with the form of the invention seen in Figures 1 through 9, inclusive.

In operation, the modification of Figures 10 through 12, inclusive, is seen to be similar to the operation of the preceding form of the invention. With the cab extension assembly 244 in a retracted position within the main cab 22a (not shown in the drawings but similar in appearance to the view provided by Figure 2 of the drawings) the seat assembly 155a is placed in the auxiliary position shown in Figures 10, 11, and 12 in the manner in which the seat assembly 155 was activated in the previous form. Then, the operator manually slides the auxiliary extension 244 rectilinearly outward from its nested position in the main cab 22a to the position shown in the last named figures. As a next step, the side doors 24a and 26a of the main cab 22a are opened, and a suitable tool having a squared end is inserted into the tool engaging slot 156a and rotated. The rotation of the actuating rod 148a causes the arms 138a to pivot upwardly, and the bosses 140a slide in the slots 142a thus moving the side frame members to the upwardly extended position shown in the several Figures 10 through 12, inclusive.

In the form of the invention shown in Figures 14 through 17, inclusive, the reference numeral 20b is applied to the vehicle body generally. The vehicle 20b includes main cab doors 24b, 26b, a cab floor 34b, and a cab roof 296. The cab roof 296 includes a substantially flat rectangular outer panel 298 spaced parallel to an inner header 300 by suitable U-shaped spacer bars 302, and the rear end of the roof 296 is provided with a substantially hollow transverse extension 304, the lower end 306 of which extends below the horizontal plane of the header 300 for a purpose described below.

Subjacent the header 300, both sides of the cab are provided with an elongated, rearwardly extending, channel shaped guide way 308—the function of which will appear infra in considering the auxiliary roof of this form of the invention.

The pillars 310, 312 of the cab 22b are substantially identical except for the reversal of their positions, and are substantially hollow rectangles in configuration, they include outer walls 314 having door engaging edges, front walls 316 which the doors bear flush against, inner walls 318 including vertical guideways 320 for a purpose described below, and rear walls 322 which also are provided with channel shaped guideways 324.

In this embodiment (Figures 14 through 17, inclusive), the auxiliary roof 326 including a main body portion 328 constructed of plastic or some other resilient material and having a plurality of cylindrical reinforcing rods 330 extending therethrough and transversely thereacross. A window panel 332, suitably held in a mounting ring 334 is also positioned in the main body portion 328. As seen in the drawings, the main body portion 328 is slidably engaged in the guideway 308 of the main cab and an activating handle 336 is provided fixedly secured to the inner end of the main body portion 328.

The side frame members 338, 340 include substantially sector-shaped frames 342 having arms 344 and 346 and angular outer bars 348. With reference to Figure 16, it will be seen that the outer bars 348 are also substantially sector-shaped in cross section and have bottom sides 350 and inner sides 352. The inner sides 352 have channel-shaped guideways 354 formed therein for the reception of the outer sides of the main body portion 328 of the auxiliary roof 326, and the lower sides 350 are notched at 356 to provide a space for mounting the side frame windows, the windows 358 being secured in the frame 338 and 340 by conventional beading 360.

In Figure 15 it will be noted that the side frames 338 or 340 are pivotally mounted at the inner ends of the side walls 64b, 66b by pivot means 362 located at the juncture of the arms 344, 346 and that the frames are movable into and out of the walls 64b, 66b by way of means 134b which is substantially the same as the means 134a of the previous embodiment of the following exception, that is, in this instance, the arms 346 have substantially rectangular flanges 364 depending therefrom and the aforesaid flanges have elongated slots 366 formed therein. The bosses 140b of the arms 138b are engageable in the slots 366 and movement to the frame 338, 340 is imparted thereby.

The auxiliary seat structure is identified by reference numeral 155b and is identical in construction, assembly, and operation to the seat structures 155 and 155a, previously described, the back portion thereof being pivotally connected to the truck bed 62b as was the case in the previous illustration.

It will also be noted that the main body portion 328 of the auxiliary roof 326 has an outer end member 368 of a suitable configuration to sealingly engage the upper end of the seat back structure, as well as a spring biased clamp 370 which is engageable therewith. The ends of the end member 368 are provided with cylindrical pinnacles 369, 371 which are engageable in the guideways 354, 308 or 320.

The arms 344 have flanges 372 which are engageable in the guideways 324 formed in the pillars 310, 312, thereby creating a water-tight seal when the frames are in their extended positions.

In operation, beginning with the auxiliary cab in a retracted position (not shown), the side doors 24b and 26b of the main cab are opened, and the side frame members 338, 340 are elevated to the upright position shown in Figures 14 and 15. As a next step, the seat structure 155b is placed in the position shown therein in the manner described above in dealing with the previous forms. Then, the operator grasps the end 368 of the auxiliary roof 326 and curvilinearly slides this member through the guideways 308 and 354 and down to connection with the upper end of the aforesaid seat structure.

As seen in Figure 15, this auxiliary roof structure can also function as the rear window portion of the main cab 22b. When this position is desired, the guideway 320 is utilized and the end 368 is brought into engagement with the rear end of the seat portion of the seat structure when in its upright position.

Having described and illustrated three modifications of this invention it will be understood that the same are offered merely by way of example, and that this invention is to be limited only by the scope of the appended claims.

What is claimed is:

1. In a vehicle having a cab including sides and a roof, and having a body extending rearwardly from the cab and including a bed and side panels; a cab extension assembly including a roof panel, means mounting the roof panel to said roof of the cab for rearward movement therefrom to constitute a rearward prolongation of said cab roof, a pair of side frame members movably carried by the side panels and mounted for movement vertically therefrom into erected positions disposed above the side panels, means for moving the side frame members into and out of erected positions to complement the roof panel when in erected positions, means carried by the roof panel defining an upper panel section for the cab when the roof panel is in a forward position and forming an upper panel section for the cab extension assembly when the roof panel is in a rearward position and means complementing the foregoing means and forming a lower panel section for the cab extension assembly.

2. The combination of claim 1 further including seating means for the cab extension assembly, said seating means forming a lower panel section for the cab when the cab extension assembly is not in use.

3. In a vehicle having a cab including sides and a roof and having a body extending rearwardly from the cab and including a bed and side panels; a cab extension assembly including a roof panel housed in the roof of the cab and slidable rearwardly therefrom to constitute a rearward prolongation thereof, side frame members housed in the side panels and mounted for movement vertically therefrom into erected positions disposed above the side panels, means for moving the side frame members into and out of erected positions, a rear panel assembly for the cab and including an upper panel section fixed to the roof panel and depending therefrom and movable into a rearward position with the roof panel to define the upper rear panel section for the cab extension assembly and further including a lower panel section for the cab, said lower panel section being mounted for rearward swinging movement from a vertical cab rear panel forming position into a horizontal position when the cab extension assembly is in use and having a cushion means on one side to be disposed in seat forming position when such panel section is in a horizontal position.

4. In a vehicle having a cab including sides and a roof and having a body extending rearwardly from the cab and including a bed and side panels; a cab extension assembly including a roof panel housed in the roof of the cab and slidable rearwardly therefrom to constitute a rearward prolongation thereof, side frame members housed in the side panels and mounted for movement vertically therefrom into erected positions disposed above the side panels, means for moving the side frame members into and out of erected positions, a rear panel assembly for the cab and including an upper panel section fixed to the roof panel and depending therefrom and movable into a rearward position with the roof panel to define the upper rear panel section for the cab extension assembly and further including a lower panel section for the cab, said lower panel section being mounted for rearward swinging movement from a vertical cab rear panel forming position into a horizontal position when the cab extension assembly is in use and having a cushion means on one side to be disposed in seat forming position when such panel section is in a horizontal position and a further panel section normally disposed horizontally in a position substantially coplanar with the bed of the body and mounted on said bed for rearward swinging movement from such position into a vertical position wherein it constitutes the lower panel section for the rear panel assembly of the cab extension means.

5. In a vehicle having a cab including sides and a roof and having a body extending rearwardly from the cab and including a bed and side panels; a cab extension assembly including a roof panel housed in the roof of the cab and slidable rearwardly therefrom to constitute a rearward prolongation thereof, side frame members housed in the side panels and mounted for movement vertically therefrom into erected positions disposed above the side panels, means for moving the side frame members into and out of erected positions, a rear panel assembly for the cab and including an upper panel section fixed to the roof panel and depending therefrom and movable into a rearward position with the roof panel to define the upper rear panel section for the cab extension assembly and further including a lower panel section for the cab, said lower panel section being mounted for rearward swinging movement from a vertical cab rear panel forming position into a horizontal position when the cab extension assembly is in use and having a cushion means on one side to be disposed in seat forming position when such panel section is in a horizontal position and a further panel section normally disposed horizontally in a position substantially coplanar with the bed of the body and mounted on said bed for rearward swinging movement from such position into a vertical position wherein it constitutes the lower panel section for the rear panel assembly of the cab extension means, and such further panel section having cushion means on its side facing inwardly in its vertical position so as to define a back rest for the cab extension means.

6. In a vehicle having a cab including sides and a roof and having a body extending rearwardly from the cab and including a bed and side panels; a cab extension assembly including a roof panel housed in the roof of the cab and slidable rearwardly therefrom to constitute a rearward prolongation thereof, side frame members housed in the side panels and mounted for movement vertically therefrom into erected positions disposed above the side panels, means for moving the side frame members into and out of erected positions, a rear panel assembly for the cab and including an upper panel section fixed to the roof panel and depending therefrom and movable into a rearward position with the roof panel to define the upper rear panel section for the cab extension assembly and further including a lower panel section for the cab, said lower panel section being mounted for rearward swinging movement from a vertical cab rear panel forming position into a horizontal position when the cab extension assembly is in use and having a cushion means on one side to be disposed in seat forming position when such panel section is in a horizontal position and a further panel section normally disposed horizontally in a position substantially coplanar with the bed of the body and mounted on said bed for rearward swinging movement from such position into a vertical position wherein it constitutes the lower panel section for the rear panel assembly of the cab extension means, and such further panel section having cushion means on its side facing inwardly in its vertical position so as to define a back rest for the cab extension means and means for locking such further panel section in its vertical position.

7. In a vehicle having a cab including sides and a roof and having a body extending rearwardly from the cab and including a bed and side panels; a cab extension assembly including a roof panel housed in the roof of the cab and slidable rearwardly therefrom to constitute a rearward prolongation thereof, side frame members housed in the side panels and mounted for movement vertically therefrom into erected positions disposed above the side panels, means for moving the side frame members into and out of erected positions, a rear panel assembly for the cab and including an upper panel section fixed to the roof panel and depending therefrom and movable into a rearward position with the roof panel to define the upper rear panel section for the cab extension assembly and further including a lower panel section for the cab, said lower panel section being mounted for rearward swinging movement from a vertical cab rear panel forming position into a horizontal position when the cab extension assembly is in use and having a cushion means on one side to be disposed in seat forming position when such panel section is in a horizontal position and a further panel section normally disposed horizontally in a position substantially coplanar with the bed of the body and mounted on said bed for rearward swinging movement from such position into a vertical position wherein it constitutes the lower panel section for the rear panel assembly of the cab extension means, and said bed having a well for housing the further panel section so that one side thereof, when it is in its horizontal position is substantially coplanar with the bed.

8. In a vehicle having a cab including sides and a roof and having a body extending rearwardly from the cab and including a bed and side panels; a cab extension assembly including a roof panel housed in the roof of the cab and slidable rearwardly therefrom to constitute a rearward prolongation thereof, side frame members housed in the side panels and mounted for movement vertically therefrom into erected positions disposed above the side panels, means for moving the side frame members into and out of erected positions, a rear panel assembly for the cab and including an upper panel section movable into a rearward position with the roof panel to define the upper rear panel section for the cab extension assembly and further including a lower panel section for the cab, said lower panel section being mounted for rearward swinging movement from a vertical cab rear panel forming position into a horizontal position when the cab extension assembly is in use and having a cushion means on one side to be disposed in seat forming position when such panel section is in a horizontal position, said upper panel section of the rear panel assembly being integral with the roof panel.

9. In a vehicle having a cab including sides and a roof and having a body extending rearwardly from the cab and including a bed and side panels; a cab extension assembly including a roof panel housed in the roof of the cab and slidable rearwardly therefrom to constitute a rearward prolongation thereof, side frame members housed in the side panels and mounted for movement vertically therefrom into erected positions disposed above the side panels, means for moving the side frame members into and out of erected positions, a rear panel assembly for the cab and including an upper panel section movable into a rearward position with the roof panel to define the upper rear panel section for the cab extension assembly and further including a lower panel section for the cab, said lower panel section being mounted for rearward swinging movement from a vertical cab rear panel forming position into a horizontal position when the cab extension assembly is in use and having a cushion means on one side to be disposed in seat forming position when such panel section is in a horizontal position, said upper panel section of the rear panel assembly being formed in one piece with the roof panel and said roof panel being flexible and movable curvilinearly into and out of the roof of the cab.

10. In a vehicle having a cab including sides and a roof and having a body extending rearwardly from the cab and including a bed and side panels; a cab extension assembly including a roof panel housed in the roof of the cab and slidable rearwardly therefrom to constitute a rearward prolongation thereof, side frame members housed in the side panels and mounted for movement vertically therefrom into erected positions disposed above the side panels, means for moving the side frame members into and out of erected positions, a rear panel assembly for the cab and including an upper panel section movable into a rearward position with the roof panel to define the upper rear panel section for the cab extension assembly and further including a lower panel section for the cab, said lower panel section being mounted for rearward swinging movement from a vertical cab rear panel forming position into a horizontal position when the cab extension assembly is in use and having a cushion means on one side to be disposed in seat forming position when such panel section is in a horizontal position, said upper panel section being rigid with the roof panel and depending from the outer end thereof.

11. In a vehicle having a cab including sides and a roof and having a body extending rearwardly from the cab and including a bed and side panels; a cab extension assembly including a roof panel housed in the roof of the cab and slidable rearwardly therefrom to constitute a rearward prolongation thereof, side frame members housed in the side panels and mounted for movement vertically therefrom into erected positions disposed above the side panels, means for moving the side frame members into and out of erected positions, a rear panel assembly for the cab and including an upper panel section movable into a rearward position with the roof panel to define the upper rear panel section for the cab extension assembly and further including a lower panel section for the cab, said lower panel section being mounted for rearward swinging movement from a vertical cab rear panel forming position into a horizontal position when the cab extension assembly is in use and having a cushion means on one side to be disposed in seat forming position when such panel section is in a horizontal position, said upper panel section being hingedly mounted on the outer end of the roof panel.

12. In a vehicle having a cab including sides and a roof and having a body extending rearwardly from the cab and including a bed and side panels; a cab extension assembly including a roof panel housed in the roof of the cab and slidable rearwardly therefrom to constitute a rearward prolongation thereof, side frame members housed in the side panels and mounted for movement vertically therefrom into erected positions disposed above the side panels, means for moving the side frame members into and out of erected positions, a rear panel assembly for the cab and including an upper panel section fixed to the roof panel and depending therefrom and into a rearward position with the roof panel to define the upper rear panel section for the cab extension assembly and further including a lower panel section for the cab, said lower panel section being mounted for rearward swinging movement from a vertical cab rear panel forming position into a horizontal position when the cab extension assembly is in use and having a cushion means on one side to be disposed in seat forming position when such panel section is in a horizontal position, and a further panel section hinged to lie flat on the bed and to be swung vertically upwardly, into vertical alignment with the upper panel section when the roof panel is in its rearward position and means for locking the further panel section and the upper panel section together to form a back wall for the cab extension assembly when in use.

13. In a vehicle having a cab including sides and a roof and having a body extending rearwardly from the cab and including a bed and side panels; a cab extension assembly including a roof panel housed in the roof of the cab and slidable rearwardly therefrom to constitute a rearward prolongation thereof, side frame members housed in the side panels and mounted for movement vertically therefrom into erected positions disposed above the side panels, means for moving the side frame members into and out of erected positions, a rear panel assembly for the cab and including an upper panel section fixed to the roof panel and depending therefrom and into a rearward position with the roof panel to define the upper rear panel section for the cab extension assembly and further including a lower panel section for the cab, said lower panel section being mounted for rearward swinging movement from a vertical cab rear panel forming position into a horizontal position when the cab extension assembly is in use and having a cushion means on one side to be disposed in seat forming position when such panel section is in a horizontal position, and a further panel section hinged to lie flat on the bed and to be swung vertically upwardly, into vertical alignment with the upper panel section when the roof panel is in its rearward position and means for locking the further panel section and the upper panel section together to form a back wall for the cab extension assembly when in use, and said bed having a well receiving the further panel section when the cab extension assembly is not in use.

References Cited in the file of this patent

UNITED STATES PATENTS

| | | |
|---|---|---|
| 992,298 | Twombly | May 16, 1911 |
| 1,632,672 | Obergfell et al. | June 14, 1927 |
| 2,555,942 | Supplee | June 5, 1951 |
| 2,647,788 | Kaiser et al. | Aug. 4, 1953 |

FOREIGN PATENTS

| | | |
|---|---|---|
| 165,690 | Switzerland | Feb. 16, 1934 |